United States Patent
Meirelles Tomanik

(10) Patent No.: US 9,915,220 B2
(45) Date of Patent: Mar. 13, 2018

(54) SLIDING ASSEMBLY

(71) Applicants: Mahle Metal Leve S/A, Jundiai-Sp (BR); Mahle International GmbH, Stuttgart (DE)

(72) Inventor: Antonio E. Meirelles Tomanik, Sao Paulo (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 31 days.

(21) Appl. No.: 14/907,274

(22) PCT Filed: Jul. 23, 2014

(86) PCT No.: PCT/BR2014/000247
§ 371 (c)(1),
(2) Date: Jan. 22, 2016

(87) PCT Pub. No.: WO2015/010178
PCT Pub. Date: Jan. 29, 2015

(65) Prior Publication Data
US 2016/0153392 A1      Jun. 2, 2016

(30) Foreign Application Priority Data

Jul. 24, 2013   (BR) .......................... 1020130189529

(51) Int. Cl.
*C23F 17/00* (2006.01)
*F02F 1/00* (2006.01)
(Continued)

(52) U.S. Cl.
CPC ............... *F02F 1/004* (2013.01); *F02F 1/20* (2013.01); *F02F 5/00* (2013.01); *F16J 9/26* (2013.01); *F16J 10/04* (2013.01)

(58) Field of Classification Search
CPC ...... F02F 1/004; F02F 1/20; F02F 5/00; F16J 10/04
(Continued)

(56) References Cited

U.S. PATENT DOCUMENTS

| | | | | |
|---|---|---|---|---|
| 3,749,072 A | * | 7/1973 | Schweikher | .............. F02F 1/20 123/193.2 |
| 5,701,861 A | * | 12/1997 | Hegemier | ............... B24B 33/02 123/193.2 |

(Continued)

FOREIGN PATENT DOCUMENTS

| | | |
|---|---|---|
| DE | 19605588 A1 | 8/1997 |
| DE | 102006057111 A1 | 6/2008 |

(Continued)

OTHER PUBLICATIONS

English Abstract for DE 102006057111A1.
(Continued)

*Primary Examiner* — Marguerite McMahon
(74) *Attorney, Agent, or Firm* — Fishman Stewart PLLC

(57) ABSTRACT

A sliding assembly for utilization in an internal combustion engine may include at least one piston ring and a cylinder head provided with a through cavity defining an internal surface. The internal surface may define a TDC portion in a proximity of a top dead center, a central portion, and a BDC portion in a proximity of bottom dead center. The TDC portion, central portion, and BDC portion may present surface finishes having a first roughness, a second roughness, and a third roughness, respectively, each defined by a structure of recesses and projections, at least one of which may be substantially uniform. The second roughness may be less than the first roughness value. The piston ring may (Continued)

present at least part of a contact surface upon which a ceramic coating may be applied by a physical vapor deposition.

20 Claims, 4 Drawing Sheets

(51) Int. Cl.
  *F02F 1/20* (2006.01)
  *F02F 5/00* (2006.01)
  *F16J 10/04* (2006.01)
  *F16J 9/26* (2006.01)

(58) Field of Classification Search
  USPC .......................................... 123/193.2, 193.3
  See application file for complete search history.

(56) References Cited

U.S. PATENT DOCUMENTS

| | | |
|---|---|---|
| 5,743,536 A | 4/1998 | Komuro et al. |
| 6,096,143 A | 8/2000 | Ruckert et al. |
| 2003/0192501 A1 | 10/2003 | Ishikawa et al. |
| 2006/0269790 A1* | 11/2006 | Sarabanda ............ C23C 14/025 428/698 |
| 2008/0256794 A1* | 10/2008 | Maier ...................... C23C 8/02 29/888.07 |
| 2010/0295251 A1* | 11/2010 | Sekiya ................ C23C 14/0036 277/443 |
| 2010/0319647 A1* | 12/2010 | Ogawa .................... C22C 21/00 123/193.2 |
| 2012/0205876 A1* | 8/2012 | Fujimura .................. F16J 9/20 277/442 |
| 2012/0216771 A1 | 8/2012 | Daiker et al. |

FOREIGN PATENT DOCUMENTS

| | | | |
|---|---|---|---|
| DE | 102009010791 A1 | 9/2010 | |
| EP | 0693618 A1 | 1/1996 | |
| FR | 2884889 A1 | 10/2006 | |
| JP | 2004176556 A | 6/2004 | |
| WO | WO 2011000068 A1 * | 1/2011 | ......... C23C 14/0641 |

OTHER PUBLICATIONS

English Abstract for DE 102009010791A1.
English Abstract for DE 19605588A1.
English Abstract for JP 2004176556A.
English Abstract for FR 2884889A1.

* cited by examiner

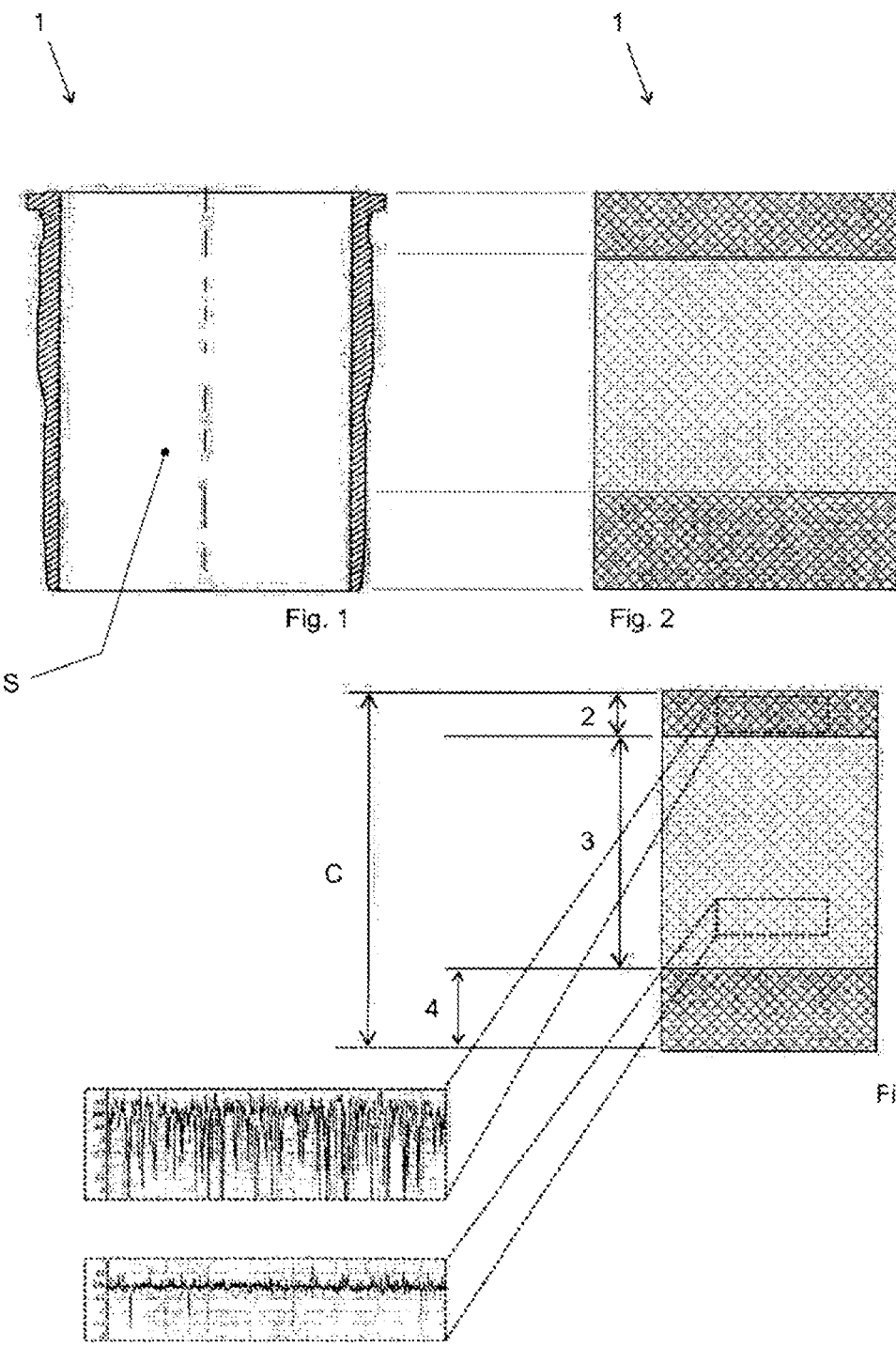

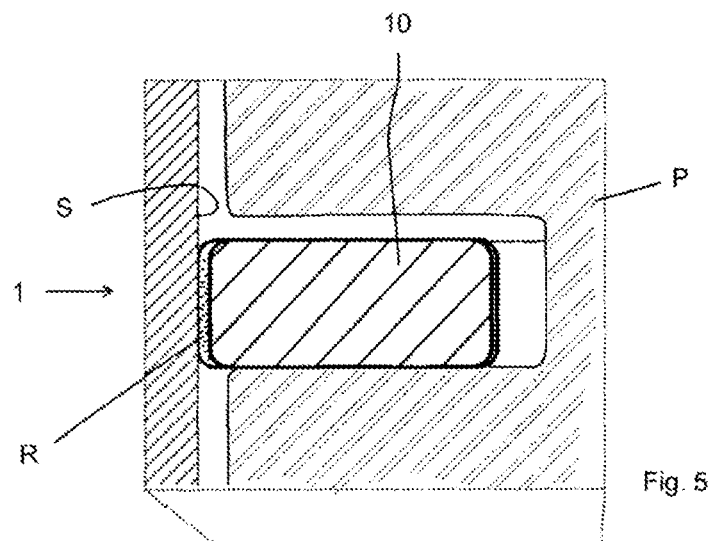
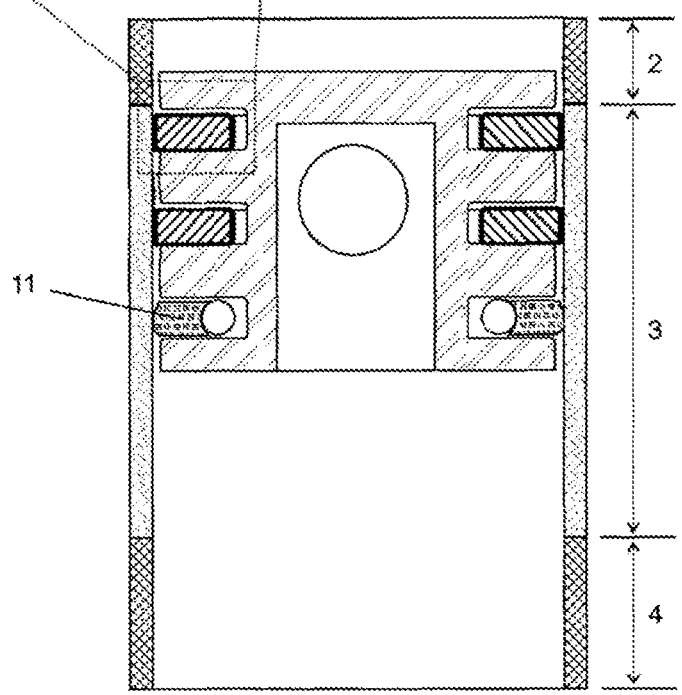

SLIDING ASSEMBLY

CROSS-REFERENCE TO RELATED APPLICATIONS

This application claims priority to Brazilian Patent Application No. 10 2013 018952 9, filed Jul. 24, 2013, and International Patent Application No. PCT/BR2014/000247, filed Jul. 23, 2014, both of which are hereby incorporated by reference in their entirety.

TECHNICAL FIELD

The present invention relates to a sliding assembly composed of a cylinder liner and a piston ring.

The cylinder liner has an internal wall presenting variation in the roughness of the contact surface such that, considering the reciprocating motion of a piston within the interior of the liner, the central portion presents a roughness lower than that presented by the two limiting portions of the stroke of the piston. The piston ring, in turn, presents a ceramic coating deposited by the PVD (physical vapor deposition) process and this coating, taken together with the characteristics of the contact surface of the liner, ensures great resistance to the wear of the ring.

BACKGROUND

In an internal combustion engine the greatest wear of the piston rings occurs at the free extremities (tips) or neighborhood thereof, by virtue of the greater contact pressure.

Described more specifically, the wear of the tips of the rings may be up to three times greater than that occurring in other regions of the part, the great focus of occurrence of the phenomena of spalling and peeling of the coating taking place at that point.

Diverse techniques have been developed having the objective of reducing this wear on the extremities of the piston rings, the basis/focus thereof, however, being the piston ring alone. The diverse techniques developed for cylinder liners in general relate to the reduction of friction.

A first development is revealed in the case of patent DE 102006057111, property of the applicant, relating to a piston liner wherein the roughness varies along the length in the sense of displacement of the piston within the interior thereof. More specifically, the portion adjacent to the maximum travel of the piston in the direction towards the head possesses a region having a first roughness and the central region of the liner, in terms of the travel of the piston, presents a second roughness, it being that on the intermediate portion of the working surface of the liner the roughness value exceeds that of the extremities. The focus of this document however resides solely in the specifications of the liner, without this being linked to the type of ring which will slide within the interior thereof, the distribution of peaks and valleys (Rpk, Rk and Rvk values) on the surface of the liner not being specified.

The patent document DE 102009010791 reveals a cylinder liner provided with a roughness value greater at the extremities in relation to the roughness value in the central region. However the process utilized for the obtainment of these structures leads to the incidence of recesses having greater and lesser depth (the depth varying considerably therebetween), diminishing the potential effectiveness of this solution as lubricating oil accumulation pockets. However, moreover, the focus of this document resides solely in the specifications of the liner without this being linked to the type of ring which will slide within the interior thereof.

The patent document DE 19605588 relates to a cylinder liner the internal surface whereof presents greater roughness values at the extremities in relation to the central portion. However in order for this result to be achieved the honing process having some technical parameters to treat the surface of the extremity regions is utilized, utilizing different parameters in the central region. Furthermore, the focus of this document resides solely in the specifications of the liner without this being linked to the type of ring which will slide within the interior thereof.

The patent document JP 2004/176556 defines a cylinder liner the angle between the recesses whereof is variable, being greater (angle $\alpha$) at the extremity of the travel of the piston than on the central portion (angle $\gamma$). On the intermediate portions, between the central portion and each of the extremities, the angle ($\beta$) is intermediate.

Finally, patent document FR 2884889 relates to a cylinder liner the sliding surface whereof presents three roughness values, being (i) a first value S1, lower (less rough) in the extremity portion facing the head, in the central portion and in the opposed extremity, (ii) a second roughness value S2 of medium roughness applied between the extremity portion facing the head and the central portion and, finally, (iii) a third higher roughness value S3 applied between the central portion and the extremity portion opposed to that facing the head. Herein, also, the focus resides solely in the specifications of the liner without this being linked to the type of ring which will slide within the interior thereof.

Having the objective of reducing this wear the applicant has developed the present sliding assembly wherein the cylinder liner has an internal wall presenting variation in the roughness of the contact surface such that, considering the reciprocating motion of a piston within the interior of the liner, the central portion presents a roughness lower than that presented by the two limiting portions of the stroke of the piston (top dead center, TDC, and bottom dead center, BDC). In the present solution, whilst the roughness varies, the structure of the recesses and projections ('valleys' and 'peaks') defining the roughness is substantially uniform, permitting a greater study and a greater efficiency of the recesses in terms of the acting thereof as oil reservoirs.

In terms of the piston ring, this possesses a ceramic coating applied by the PVD (physical vapor deposition) process and this coating, taken together with the aforementioned characteristics of the contact surface of the liner, ensure a great resistance to wear.

SUMMARY

The present invention has as object a sliding assembly formed by a cylinder liner and a piston ring, wherein the cylinder liner possesses an internal wall presenting variation in the roughness of the contact surface such that, considering the reciprocating motion of a piston within the interior of the liner, the central portion presents a roughness lower than that presented by the two portions in the proximity of the stroke of the piston (specifically in the proximity of the top dead center, TDC), thereby rendering possible a reduction in the wear of the piston ring presenting a ceramic coating applied by the PVD process.

The present invention moreover has as object hereof a sliding assembly formed by a cylinder liner and a piston ring wherein the cylinder liner possesses an internal wall presenting variation in the roughness of the contact surface such that, considering the reciprocating motion of a piston within the interior of the liner, the central portion presents a roughness lower than that presented by the two limiting portions of the stroke of the piston (specifically in the proximity of the top dead center, TDC), the existence of the structure of the deepest recesses ('valleys') in the region in the proximity of the TDC thereby rendering possible a reduction in the wear of the piston ring provided with a ceramic coating applied by the PVD process, specifically due to spalling.

The objects of the present invention are achieved through a sliding assembly for utilization in an internal combustion engine comprising a cylinder liner and at least one piston ring, the liner being provided with a through cavity defining an internal surface which, in turn, defines three portions, being a first portion in the proximity of the limit of the stroke of the piston, facing the head of the engine (in the proximity of the top dead center, TDC), a second, central, portion, and a third portion in the proximity of the limit of the stroke of the piston, facing the crankshaft of the engine (in the proximity of the top dead center, TDC), wherein:
(i) the TDC portion of the liner presents a surface finish having a first roughness value defined by a structure of the recesses and projections ('valleys' and 'peaks'); the central portion of the liner presents a surface finish having a second roughness value defined by a structure of the recesses and projections ('valleys' and 'peaks'); the BDC portion of the liner (1) presents a surface finish having a third roughness value defined by a structure of the recesses and projections ('valleys' and 'peaks'), the roughness value presented by the central portion being substantially lower than the roughness value of the TDC portion, and having the structure of the recesses and projections ('valleys' and 'peaks') defining it substantially uniform; and
(ii) the piston ring presents at least part of the contact surface thereof whereupon a ceramic coating is applied by the physical vapor deposition (PVD) process.

The present invention will be described below in a more detailed manner, based on an example of embodiment represented in the drawings.

BRIEF DESCRIPTION OF THE DRAWINGS

The figures show:

FIG. 1 is a cross-sectional view of the cylinder liner forming part of the sliding assembly object of the present invention.

FIG. 2 is a schematic view of the liner illustrated in FIG. 1, showing the schematic representation of the roughness of the sliding surface along the longitudinal length thereof.

FIG. 3 is a schematic view of the liner illustrated in FIGS. 1 and 2, showing the schematic representation of the roughness of the sliding surface along the longitudinal length thereof, and graphs demonstrating the average roughness value on different portions.

FIG. 4 is a cross-sectional schematic view of the liner and of the piston ring belonging to the sliding assembly object of the present invention, the ring being installed in the groove of a piston.

FIG. 5 is a magnified cross-sectional schematic view of part of the cylinder liner and of the piston ring forming part of the sliding assembly object of the present invention.

DETAILED DESCRIPTION

Figure 6:
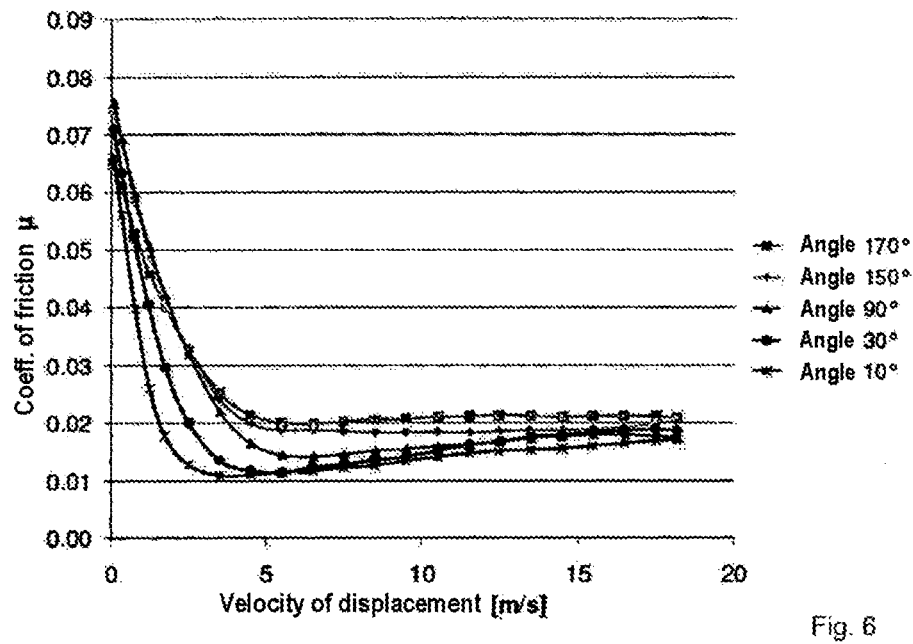
FIG. 6 is a graph of the relationship between the coefficient of friction $\mu$ and the velocity of displacement of the piston/ring upon the surface of a cylinder liner, considering diverse angles of honing.

The present invention relates to a sliding assembly provided with a cylinder liner 1 and with at least one piston ring 10, both thereof specially developed, wherein the cylinder liner defines an internal wall presenting variation in the roughness of the contact surface such that, considering the reciprocating motion of the ring within the interior of the liner, the central portion presents a roughness lower than that presented by the two portions in the proximity of the limits of the stroke of the piston (top dead center, TDC, and bottom dead center, BDC). The piston ring possesses a ceramic coating R applied by the physical vapor deposition (PVD) process.

By means of the assembly object of the present invention, a reduction of the wear on the coating of the piston ring is achieved by virtue of the existence of recesses having a high volume, uniform therebetween, on the lining. The reduction in wear reduces the occurrence of the phenomenon of spalling.

Describing the sliding assembly, object of the present invention, in a somewhat more detailed manner, the cylinder liner 1 is provided with a through cavity having a longitudinal/axial length C, in the interior whereof is positioned the piston ring 10. FIG. 4 illustrates the piston with the respective rings thereof, at least one thereof being the ring 10 provided with a ceramic coating R applied by PVD. The through cavity defines an internal surface S.

The piston ring 10 may assume any configuration required or desirable. In a preferable manner, the ring 10 is a first groove ring, or compression ring, having a metal base, however it is evident that it may assume the configuration of a second groove ring or even an oil scraper ring without the resultant sliding assembly ceasing to be included within the scope of protection of the claims appended.

In the same manner, the base material of the ring 10 may vary freely always provided that it renders possible the application of a ceramic coating R such as, for example, chromium nitride, niobium nitride or others, by means of the PVD process.

The liner 1, in turn, is habitually manufactured from ferrous alloys, cast iron, or steel, however it is evident that it may be manufactured from any other material required or desirable (such as aluminum alloys), also without the resulting invention ceasing to be included within the scope of protection of the claims appended. Analogously, the liner 1 may present any format required or desirable, provided that it is functional.

The surface S defines three principal portions clearly observable in FIGS. 2 and 3, there being a first portion 2 corresponding to the region in the proximity of the limit of the stroke of the piston facing the head of the engine (top dead center, TDC), hereinafter denominated TDC portion, a second, central, portion 3, and a third portion 4 corresponding to the region in the proximity of the limit of the stroke of the piston, however opposed (facing the crankshaft of the engine, bottom dead center, BDC), hereinafter denominated BDC portion.

It is furthermore evident that the length and the area comprising each of the portions 2, 3, 4 may vary freely depending on the diameter of the liner, travel of the piston and axial length of the liner, among other variables.

Whatever the specification of the liner 1, and considering the three portions 2, 3, 4 defined on the internal surface S, it is imperative that it be constituted in such a manner that:
(i) the TDC portion (2) presents a surface finish having a first roughness value defined by a structure of the recesses and projections ('valleys' and 'peaks');
(ii) the central portion (3) presents a surface finish having a second roughness value defined by a structure of the recesses and projections ('valleys' and 'peaks'); and
(iii) the BDC portion (4) presents a surface finish having a third roughness value defined by a structure of the recesses and projections ('valleys' and 'peaks').

In a preferable manner, the TDC, central and BDC portions 2, 3, 4 receive the surface finish such as to attain the respective first, second and third roughness values by means of the honing process. Some solutions of the prior art employ different surface finishing processes to obtain different standards of roughness in the longitudinal sense of the liner, however the present invention utilizes honing and controls the process variations such that substantially different roughness values are obtained on the same surface S, in addition to ensuring control of the angle of the grooves inherent to this type of process, which will be commented upon below.

It is furthermore an essential condition of the liner 1 that the second roughness value (presented by the central portion 3) be substantially lower than the roughness value of the TDC portion 2, having the objective of ensuring the maximum performance in terms of efficiency of operation of the engine and reduction in the wear of the rings, in particular on the tips. In a preferable but not obligatory manner, the roughness value of the BDC portion 4 is also greater than the roughness value presented by the central portion 3. A more detailed explanation may be found below of the reason for the greater efficiency of the liner 1, object of the present invention, in comparison with the others.

A further imperative characteristic of the assembly object of the present invention is the control of the honing process of the liner 1, object of the present invention, on the TDC, central and BDC portions 2, 3, 4 to ensure that the structure of the recesses and projections ('valleys' and 'peaks') on each thereof is substantially uniform throughout the entire area wherein it is distributed.

In other words, on each of the portions 2, 3, 4, respecting the respective average roughness value, the microscopic recesses (valleys') present the same average depth with low standard deviation, in the same manner that the projections (peaks') possess the same average height, with an equally low standard deviation.

In this manner it is ensured that, in terms of the recesses, the depth and volume presented thereby are ideal for the storage of lubricating oil and, in terms of the projections, the avoidance of very high projections is achieved which increase the period of running in of the engine, in addition to leading to increase in fuel consumption and increase in temperature, both thereof being undesirable.

A further imperative characteristic presented by the liner 1 is the roughness value presented by the central portion 3 being substantially lower than the roughness values of the TDC and BDC portions 2, 4.

In this respect it must be noted that, during the operation of the internal combustion engine, the linear velocity of the piston reduces at the extremities (limit of travel, corresponding to the top dead center, TDC, and to the bottom dead center, BDC) and increases in the central portion of the liner (halfway through travel). Arising from this fact, the stresses to which the piston P and the ring 10 are subjected vary greatly.

In situations of proximity to limit of travel (that is to say, in the proximity of the TDC and BDC portions 2, 4 of the surface S of the liner 1), the linear velocity of the piston is low, independently of whether it is accelerating or reducing velocity. In this situation the low velocity leads to a lower loss through friction by virtue of the fact that in a given unit of time the distance traveled by the piston is short. In the liner 1, in addition to the low velocity naturally occasioning a lower wear, the higher roughness value leads to the existence of projections of great height and recesses of great depth, such that the oil dwelling therein contributes significantly to preventing the ring/surface friction and, by means whereof, to ensuring a lower wear of the rings, in particular at the tips thereof. In other words, the substantially uniform structure of the recesses and projections defining the second roughness value presented by the second portion 3 permits the dimensioning of the recesses in a more efficient manner for acting as oil reservoirs.

Furthermore, in the central portion 3 of the liner 1 the velocity of linear displacement of the piston is high and, concomitantly, the roughness value is low (by virtue of the fact that the roughness value presented by the second portion 3 is substantially lower than the roughness values presented by the TDC and BDC portions 2, 4). This configuration reduces the loss by the engine through friction, in the central portion being in theory higher for a same roughness value by virtue of the greater distance traveled by the piston in a given unit of time.

In the central portion 3, the velocity of the piston/rings is higher. A larger hydrodynamic film is generated. The forces of the gases acting upon the compression ring are lower, requiring a smaller oil reservoir. In addition, by virtue of the higher velocities, the frictional (power) losses are greater.

In this region the solution proposed, of a lower roughness, produces smaller oil films and frictional losses, without substantial impact on the wear.

In a preferable but not obligatory manner, the roughness value presented by the BDC portion 4 and the roughness value presented by the TDC portion 2 are substantially equivalent, however both may vary from one another provided that they are lower in comparison with the second roughness value, with the objective that the liner 1 presents improved performance. In any case it is sufficient that the roughness value on the TDC portion 2 is greater than the roughness value of the central portion 3.

The table below presents three possible embodiments for the liner 1 object of the present invention, denominated respectively 'embodiment A', 'embodiment B' and 'embodiment C'.

|  | Embodiment A | | | Embodiment B | | | Embodiment C | | |
|---|---|---|---|---|---|---|---|---|---|
|  | Rpk | Rk | Rvk | Rpk | Rk | Rvk | Rpk | Rk | Rvk |
| TDC | 0.10 to 0.30 | 0.80 to 1.10 | 2.1 to 2.8 | 0.15 max | 0.80 to 1.10 | 2.1 to 2.8 | As embodiment A (possibly as B) | | |
| Middle | 0.25 max | 0.15 to 0.65 | 1.1 to 2.1 | 0.10 max | 0.10 to 0.40 | 1.0 max | | | |
| BDC | Equal to TDC | | | Equal to TDC | | | Equal to TDC | | |
| Honing angle | 50 to 60° | | | 50 to 60° | | | 20 to 25° at TDC, approximately 155° in the middle. At BDC as may be easiest. | | |

The embodiment A presents the following values, in micrometers:
(i) The roughness value of the TDC portion 2 presents values of substantially 0.10 to 0.30 Rpk, 0.80 to 1.10 Rk and 2.1 to 2.8 Rvk.
(ii) The roughness value of the central portion 3 (denominated 'middle' in the table) presents values of substantially up to 0.30 Rpk, 0.15 to 0.65 Rk and 1.1 to 2.1 Rvk, and
(iii) The roughness value of the BDC portion 4 presents values of substantially 0.10 to 0.30 Rpk, 0.80 to 1.10 Rk and 2.1 to 2.8 Rvk.

The embodiment B, in turn, presents the following values in micrometers:
(i) The roughness value of the TDC portion 2 presents values of substantially up to 0.15 Rpk, 0.80 to 1.10 Rk and 2.1 to 2.8 Rvk.
(ii) The roughness value of the central portion 3 (denominated 'middle' in the table) presents values of substantially up to 0.10 Rpk, 0.10 to 0.40 Rk and up to 1.0 Rvk.
(iii) The roughness value of the BDC portion 4 presents values of substantially up to 0.15 Rpk, 0.80 to 1.10 Rk and 2.1 to 2.8 Rvk.

Finally, the third embodiment C presents the same values as embodiment A or B in terms of the three roughness values (also in micrometers), however there is variation in the angle of the recesses (channels) inherent from the honing procedure. Although the existing literature indicates that greater angles bring about an increase in the friction, being undesirable in the middle of the travel, studies through computational simulation realized by the inventor show that the variation of angle along the travel with a view to the additional advantage of that with the smaller angle (more horizontal) at the TDC, there exists a greater oil retention by virtue of the fact that the recesses are perpendicular to the motion of the piston/ring. In the middle of the travel, the greatest (more vertical) angle of the recesses facilitates the flow of the oil, contributing to reducing both the thickness of the same and the friction originating therefrom.

In order to demonstrate the advantages of the present invention, the applicant has carried out a series of studies analyzing, comparatively, the performance of a liner such as that of the present invention in comparison with conventional solutions, these being a liner wherein the entire surface S presents high roughness (a solution denominated plateau) and a liner wherein the entire surface S presents low roughness (a solution denominated slide).

The studies relate to a compression ring 10 and a cylinder liner for a motor presenting a cylinder diameter of 70.9 mm, piston travel of 75.6 mm, connecting rod of 144 mm in length, considering a constant rotation of 2000 rpm under full load and having a lubricant oil of specification SAE 20W50 at a temperature of 200° C.

The solution denominated plateau (roughest) has the advantage of the formation of a thick film on the surface S, having as corollary the greater friction, whilst the solution denominated slide presents a substantially lower friction, however having as corollary a thinner oil film, disadvantageous in situations of marginal lubrication (boundary lubrication).

The present invention offers the advantages of the plateau and slide solutions without presenting the respective disadvantages, consequently bringing together the best of each solution. The studies carried out by the applicant have shown that the present invention ensures a thick oil film on the TDC portion 2, providing a reduction of wear at that point and, concomitantly, a low roughness in the central portion ensuring lower losses through friction (power dissipated through friction).

In particular, compared with the plateau (roughest) solution the present solution offers a reduction of 15% in the losses through friction, being substantially close to the reduction obtained through the slide solution (reduction of 21%), whilst offering a film thickness in the TDC portion 2 of 1.5 μm, being substantially twice that obtained through the slide solution (0.7 μm).

Figure 7:
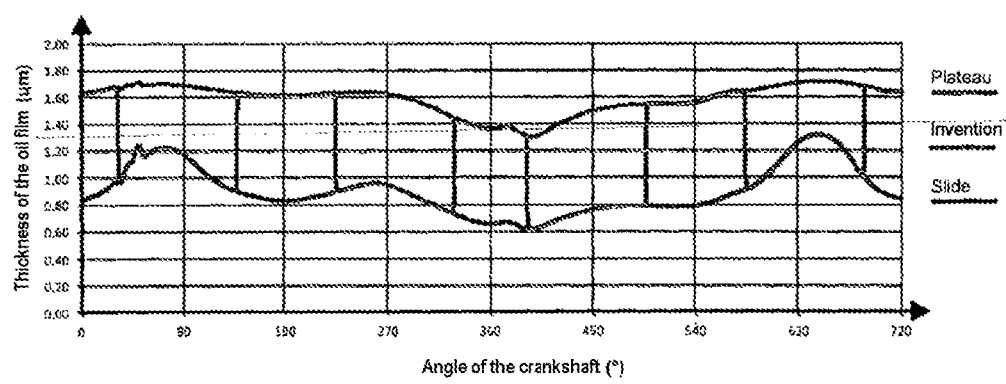
FIG. 7 is a graph illustrating the thickness of the oil film varying as a function of the angle of the crankshaft, considering a cylinder liner having high roughness (plateau), low roughness (slide) and the technology object of the present invention, wherein there is variation in the roughness of the contact surface such that the central portion presents a roughness lower than that presented by the upper limiting portion of the stroke of the piston (in the proximity of the top dead center, TDC).

The graphic of FIG. 7 illustrates the oil film thickness varying as a function of the angle of the crankshaft, considering a cylinder liner having plateau high roughness, slide low roughness and the technology object of the present invention.

It can be clearly observed from the analysis of this graphic that the oil film of the solution of the present invention is virtually identical to the oil film provided by the plateau solution at the points of reversal of motion of the piston (TDC 2 and BDC 3 portions), represented in the graphic by the crankshaft angle markings 0°, 180°, 360°, 540° and 720°, whilst the oil film is much reduced in the central portion 3, represented in the graphic by the crankshaft angle markings 90°, 270°, 450° and 630°, as in the slide solution.

Figure 8:
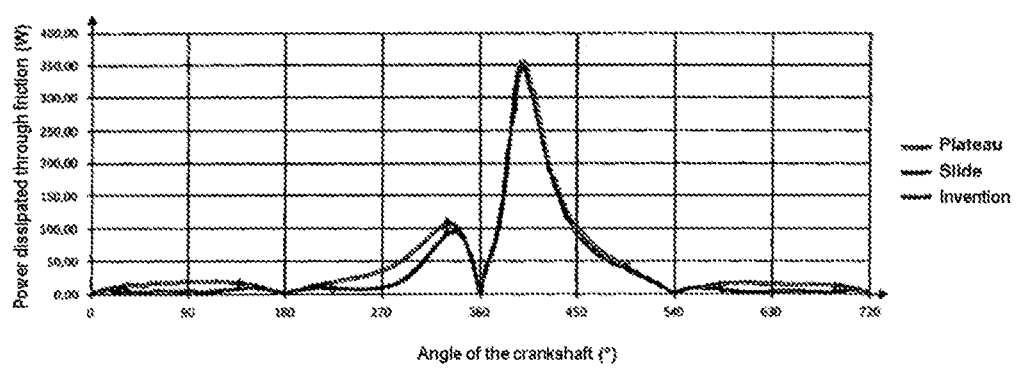
FIG. 8 is a graph illustrating the power dissipated through friction varying as a function of the angle of the crankshaft, considering a cylinder liner having high roughness (plateau), low roughness (slide) and the technology object of the present invention, wherein there is variation in the roughness of the contact surface such that the central portion presents a roughness lower than that presented by the upper limiting portion of the stroke of the piston (in the proximity of the top dead center, TDC).

In turn, the graphic of FIG. 8 illustrates the power dissipated through friction varying as a function of the angle of the crankshaft, considering a cylinder liner having plateau high roughness, slide low roughness and the technology object of the present invention. It can be clearly observed therein that the solution object of the present invention offers values of power dissipated through friction considerably lower than the plateau solution, and practically identical to the slide solution, being superior thereto solely in the TDC 2 and BDC 4 portions.

These results confirm that the solution object of the present invention offers all the advantages of the plateau and slide solutions without the corollary of the respective disadvantages.

Through the present sliding assembly, in addition to the increase in durability of the coating R of the piston ring, there is the reduction of up to 1% in the consumption of fuel of the engine equipped therewith, by virtue of the aforedescribed studies carried out.

An example of a preferred embodiment having been described, it shall be understood that the scope of the present invention covers other possible variations, being limited solely by the content of the claims appended, therein included the possible equivalents.

The invention claimed is:
1. A sliding assembly for utilization in an internal combustion engine, comprising:
at least one piston ring; and a cylinder liner provided with a through cavity defining an internal surface which, in turn, defines:
  a TDC portion in a proximity of a limit of a stroke of the sliding assembly, facing a cylinder head of the engine (in the proximity of a top dead center, TDC),
  a central portion, and
  a BDC portion in a proximity of the limit of the stroke, facing a crankshaft of the engine (in a proximity of a bottom dead center, BDC);
wherein the TDC portion of the liner presents a surface finish having a first roughness value defined by a structure of recesses and projections; the central portion of the liner presents a surface finish having a second roughness value defined by a structure of recesses and projections; the BDC portion of the liner presents a surface finish having a third roughness value defined by a structure of recesses and projections, the roughness value of the second portion being lower than the roughness value of the first portion;
wherein at least one of:
  the recesses and projections of the TDC portion are substantially uniform;
  the recesses and projections of the central portion are substantially uniform; and
  the recesses and projections of the BDC portion are substantially uniform;
wherein the piston ring presents at least part of a contact surface thereof whereupon a ceramic coating is applied by a PVD (physical vapor deposition) process; and
wherein a honing angle of at least one of the BDC portion and the TDC portion is less than a honing angle of the central portion.

2. The sliding assembly as claimed in claim 1, wherein the first roughness value presents values of substantially 0.10 to 0.30 Rpk, 0.80 to 1.10 Rk, and 2.1 to 2.8 Rvk, in micrometers.

3. The sliding assembly as claimed in claim 1, wherein the second roughness value presents values of substantially up to 0.30 Rpk, 0.15 to 0.65 Rk, and 1.1 to 2.1 Rvk, in micrometers.

4. The sliding assembly as claimed in claim 1, wherein the third roughness value presents values of substantially 0.10 to 0.30 Rpk, 0.80 to 1.10 Rk, and 2.1 to 2.8 Rvk, in micrometers.

5. The sliding assembly as claimed in claim 1, wherein the first roughness value presents values of substantially up to 0.15 Rpk, 0.80 to 1.10 Rk, and 2.1 to 2.8 Rvk, in micrometers.

6. The sliding assembly as claimed in claim 1, wherein the second roughness value presents values of substantially up to 0.10 Rpk, 0.10 to 0.40 Rk, and up to 1.0 Rvk, in micrometers.

7. The sliding assembly as claimed in claim 1, wherein the third roughness value presents values of substantially up to 0.15 Rpk, 0.80 to 1.10 Rk and 2.1 to 2.8 Rvk, in micrometers.

8. The sliding assembly as claimed in claim 2, wherein the second roughness value presents values of substantially up to 0.30 Rpk, 0.15 to 0.65 Rk, and 1.1 to 2.1 Rvk, in micrometers.

9. The sliding assembly as claimed in claim 2, wherein the second roughness value presents values of substantially up to 0.10 Rpk, 0.10 to 0.40 Rk, and up to 1.0 Rvk, in micrometers.

10. The sliding assembly as claimed in claim 5, wherein the second roughness value presents values of substantially up to 0.30 Rpk, 0.15 to 0.65 Rk, and 1.1 to 2.1 Rvk, in micrometers.

11. The sliding assembly as claimed in claim 5, wherein the second roughness value presents values of substantially up to 0.10 Rpk, 0.10 to 0.40 Rk, and up to 1.0 Rvk, in micrometers.

12. The sliding assembly as claimed in claim 2, wherein the third roughness value presents values of substantially 0.10 to 0.30 Rpk, 0.80 to 1.10 Rk, and 2.1 to 2.8 Rvk, in micrometers.

13. The sliding assembly as claimed in claim 2, wherein the third roughness value presents values of substantially up to 0.15 Rpk, 0.80 to 1.10 Rk and 2.1 to 2.8 Rvk, in micrometers.

14. The sliding assembly as claimed in claim 5, wherein the third roughness value presents values of substantially 0.10 to 0.30 Rpk, 0.80 to 1.10 Rk, and 2.1 to 2.8 Rvk, in micrometers.

15. The sliding assembly as claimed in claim 5, wherein the third roughness value presents values of substantially up to 0.15 Rpk, 0.80 to 1.10 Rk and 2.1 to 2.8 Rvk, in micrometers.

16. The sliding assembly as claimed in claim 8, wherein the third roughness value presents values of substantially 0.10 to 0.30 Rpk, 0.80 to 1.10 Rk, and 2.1 to 2.8 Rvk, in micrometers.

17. The sliding assembly as claimed in claim 8, wherein the third roughness value presents values of substantially up to 0.15 Rpk, 0.80 to 1.10 Rk and 2.1 to 2.8 Rvk, in micrometers.

18. The sliding assembly as claimed in claim 9, wherein the third roughness value presents values of substantially 0.10 to 0.30 Rpk, 0.80 to 1.10 Rk, and 2.1 to 2.8 Rvk, in micrometers.

19. The sliding assembly as claimed in claim 1, wherein the honing angles of the BDC portion and the TDC portion are equal with values between 50 degrees and 60 degrees.

20. The sliding assembly as claimed in claim 1, wherein the honing angles of the BDC portion and the TDC portion are equal with values between 20 degrees and 25 degrees, and the honing angle of the central portion is approximately 155 degrees.

* * * * *